United States Patent
Sobue

(10) Patent No.: US 7,209,273 B2
(45) Date of Patent: Apr. 24, 2007

(54) IMAGE FORMING APPARATUS AND IMAGE FORMING METHOD

(75) Inventor: Fumitaka Sobue, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/279,770
(22) Filed: Apr. 14, 2006

(65) Prior Publication Data
US 2006/0238850 A1    Oct. 26, 2006

(30) Foreign Application Priority Data
Apr. 20, 2005 (JP) ............................. 2005-122950

(51) Int. Cl.
G02B 26/08 (2006.01)
(52) U.S. Cl. ...................... 359/216; 347/243
(58) Field of Classification Search ................ 359/216; 347/232, 233, 243
See application file for complete search history.

(56) References Cited

U.S. PATENT DOCUMENTS 6,121,992 A * 9/2000 Girmay ....................... 347/234

FOREIGN PATENT DOCUMENTS

JP    11-218988    8/1999

* cited by examiner

Primary Examiner—Euncha P. Cherry
(74) Attorney, Agent, or Firm—Fitzpatrick, Cella, Harper & Scinto

(57) ABSTRACT

An image forming apparatus which includes image forming units of a plurality of colors, each having an image carrier and a light beam scanning portion for polarizing irradiated laser beam by a polygon mirror and forming an electrostatic latent image on the image carrier, and forms a color image by superposing images formed by the image forming unit, includes a first control portion which controls the velocity of rotation of one polygon mirror in one image forming unit, a second control portion which controls rotation of another polygon mirror by velocity control or phase control in another image forming unit, and a control signal generation portion which, when the rotation velocity of another polygon mirror reaches a target velocity by velocity control of the second control portion, generates a rotation reference signal based on the driving information of one polygon mirror driven by velocity control of the first control portion, or detection information of the laser beam polarized by one polygon mirror, wherein the second control portion controls, when the control signal generation portion outputs the rotation reference signal, the rotational phase of another polygon mirror in order to achieve phase locking with the rotation reference signal.

5 Claims, 8 Drawing Sheets

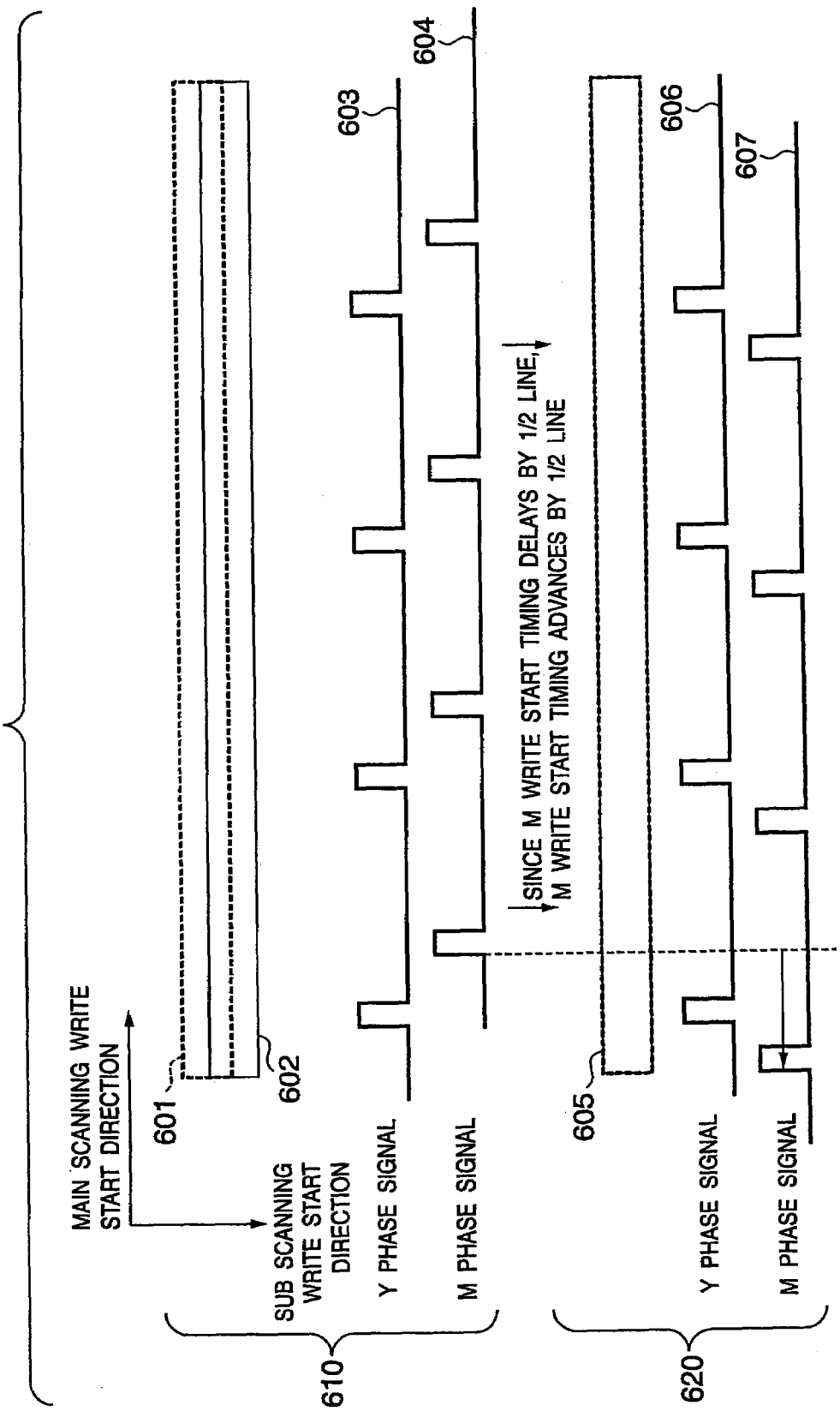

IMAGE FORMING APPARATUS AND IMAGE FORMING METHOD

FIELD OF THE INVENTION

The present invention relates to an image forming technique and, more particularly, to a color image forming technique of preventing color discrepancy by controlling an image forming timing for each color in a color image forming apparatus which has a plurality of photoconductors and light beam scanning devices to form a color image by superposing toner images of yellow (Y), cyan (C), magenta (M), and black (K).

BACKGROUND OF THE INVENTION

Conventionally, a color image forming apparatus based on an electrophotographic scheme has been known, which includes a plurality of image forming units each having a laser scanner, photosensitive drum, and the like, forms images of a plurality of different colors by using the image forming units, and transfers the images over each other on a printing medium. In this type of color image forming apparatus, images formed by the image forming units must be accurately transferred over each other on the printing medium. That is, the image forming start positions of respective images on the photosensitive drum must be accurately adjusted in a main scanning direction (the direction in which the photosensitive drum is scanned by a laser) and a sub scanning direction (a direction substantially perpendicular to the main scanning direction, and corresponding to the conveying direction of the printing medium).

As a technique for adjusting the image forming start positions, the following is known. In this technique, a registration mark for misalignment correction is transferred on a feeding belt, and misalignment between the images of respective colors is detected and corrected on the basis of the read result of this registration mark. In order to correct misalignment in the main scanning direction, on the basis of the horizontal sync signal of a light beam irradiated from each laser scanner, an image write start timing for forming a latent image of each color is adjusted in each image forming unit. As a result, misalignment between the images can be corrected even when surface phases of the scanner motors are not locked with each other.

Also, in order to correct misalignment in the sub scanning direction, rotation reference signals having the same period are supplied to scanner motor control units in the respective image forming units to control rotation operation of the scanner motors. The rotational velocities of the scanner motors coincide with each other, and misalignment in the sub scanning direction can be corrected. Furthermore, the surface phases of the respective scanner motors can be kept in predetermined phases by supplying a phase difference to each rotation reference signal. By using these techniques, a sub scanning write start timing of less than one line can be corrected, thereby correcting color discrepancy.

The control sequence of the conventional scanner motor will be described next with reference to a flowchart shown in FIG. 5. First, when the scanner motor control unit receives a scanner motor activation start signal (S501), the scanner motor control unit outputs an acceleration signal to the scanner motor (S502). Upon reception of the acceleration signal, the scanner motor starts rotation (S503). Simultaneously, the scanner motor control unit counts the period of the horizontal sync signal by using a counter (S504). The scanner motor control unit then sets the rotational velocity of the scanner motor to be close to a target rotational velocity (S505) by outputting a deceleration signal if the count value is equal to or higher than the target rotational velocity, or outputting an acceleration signal if the count value is equal to or lower than the target rotational velocity.

When the rotational velocity of the scanner motor almost reaches the target rotational velocity (YES in S506), the velocity is continuously increased and decreased to lock the phases of the rotation reference signal and the horizontal sync signal (S507). When the velocity becomes almost stable, the phases of the scanner motors are locked to be in an image forming standby state (S508). Note that PLL (Phase Locked Loop) control is not performed at the time of activation of the scanner motor. This is because misalignment (registration error) due to the influence of a phase error at the image forming start position must be prevented when the phases are locked at a velocity at which a horizontal sync signal frequency is an integer multiple of a rotation reference signal frequency.

As the above-described prior art, Japanese Patent Laid-Open No. 11-218988 discloses a technique.

When a monochromatic image is to be formed, there is no possibility of color discrepancy. Hence, the scanner motor may be rotated by velocity control, and an image may be formed by irradiating the photoconductor with a laser beam when the rotational velocity reaches a predetermined target velocity. However, when a color image is to be formed, in order to prevent color discrepancy in superposing the images of the respective colors, the scanner motors must be rotated in synchronism with each other by velocity control and PLL control. Hence, when a color image is to be formed, as compared with a case wherein a monochromatic image is to be formed, a longer time is required to stabilize rotation of the scanner motor and set the image forming unit in the image forming standby state (S508). This obstructs improvement of the productivity (throughput) of the technique of forming a color image.

SUMMARY OF THE INVENTION

The present invention has been proposed to solve the conventional problems, and has as its object to provide an image forming technique with high productivity which can shorten a time from when a polygon mirror starts rotation to when the rotational velocity becomes stable in the image forming standby state, while suppressing a registration error in forming a color image.

In order to achieve the above object, an image forming apparatus according to the present invention mainly includes the following arrangement. That is, an image forming apparatus which includes image forming units of a plurality of colors, each of which has an image carrier and a light beam scanning unit for polarizing an irradiated laser beam using a polygon mirror to form an electrostatic latent image on the image carrier, and forms a color image by superposing images formed by the image forming units, comprising:

a first control device which performs velocity control of rotation of a polygon mirror in a first image forming unit for starting forming an image first;

a second control device which can control rotation of a polygon mirror in a second image forming unit by performing velocity control and phase control; and a control signal generation device which, when a rotational velocity of the polygon mirror in the first image forming unit reaches a predetermined velocity, generates a rotation reference signal based on driving information of the polygon mirror in the first image forming unit or detection information of the laser beam polarized by the polygon mirror, wherein the second control device starts, based on the rotation reference signal generated by the control signal generation device, phase control to lock a rotational phase of the polygon mirror in the second image forming unit with a rotational phase of the polygon mirror in the first image forming unit.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 6 is a timing chart for explaining control of a phase difference according to the embodiment of the present invention.

DETAILED DESCRIPTION OF THE PREFERRED EMBODIMENT

A preferred embodiment of the present invention will now be described in detail in accordance with the accompanying drawings.

An image forming apparatus according to the embodiment of the present invention will be described below with reference to accompanying drawings. In the following description, the present invention is applied to a four-drum image forming apparatus (to be also referred to as a "laser beam printer" hereinafter) which controls a polygon mirror. However, the object of the present invention is not limited to this. The present invention can also be applied to another type of image forming apparatus which forms an image by using at least two drums in synchronism with each other.

Figure 1:
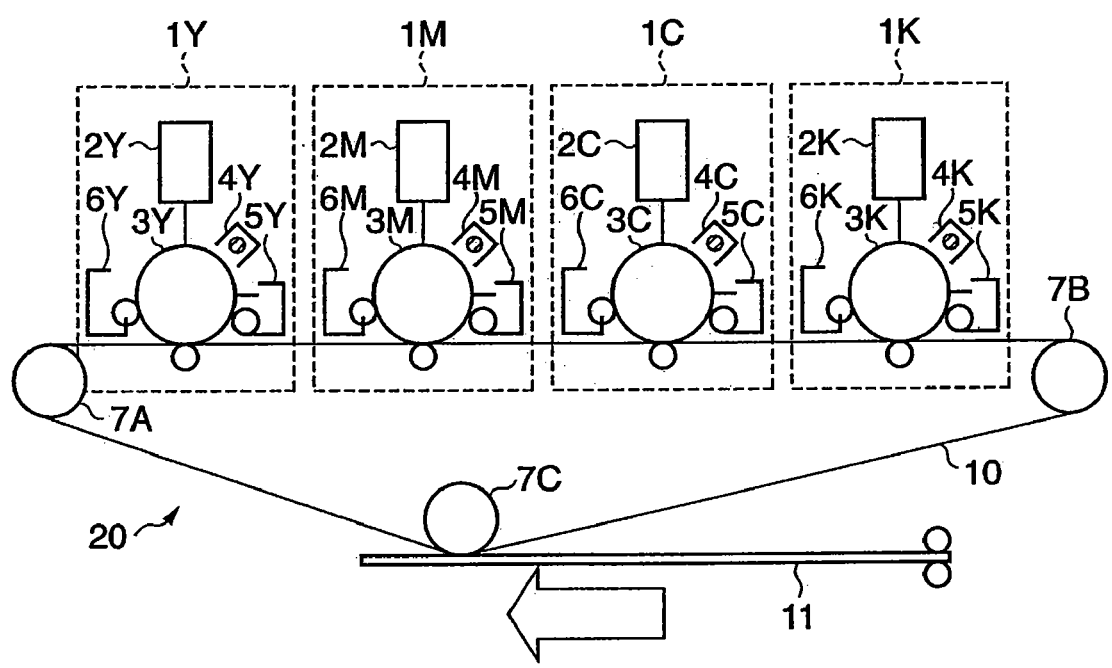
FIG. 1 is a view showing a schematic arrangement of a color image forming apparatus 20 according to an embodiment of the present invention.

FIG. 1 is a view showing a schematic arrangement of a color image forming apparatus 20 according to the embodiment of the present invention. The color image forming apparatus 20 comprises a yellow (Y) image forming unit 1Y, magenta (M) image forming unit 1M, cyan (C) image forming unit 1C, and black (K) image forming unit 1K each of which has a development unit including a light beam scanning device 2Y, 2M, 2C, or 2K (2Y, 2M, 2C, and 2K respectively correspond to yellow, magenta, cyan, and black) for applying a laser beam in order to form each electrostatic latent image, and a photoconductor 3Y, 3M, 3C, or 3K serving as an image carrier.

The image forming units (1Y, 1M, 1C, and 1K) of the respective colors are arranged at nearly equal intervals. In the lower portion of the image forming units 1Y, 1M, 1C, and 1K, an annular intermediate feeding belt 10 serving as a primary transfer body is wound on convey rollers 7A, 7B, and 7C. The image forming units (1Y, 1M, 1C, and 1K) of the respective colors form toner images on the intermediate feeding belt 10. In this embodiment, a yellow (Y) image is first formed. However, the present invention is not limited to this order shown in FIG. 1.

Note that, in the image forming unit 1Y (to be also referred to as an "Y station" hereinafter) which forms an image first, polygon mirror rotation control is performed based on velocity control. In each of the remaining image forming units (1M, 1C, and 1K) which forms an image after the Y station, polygon mirror rotation control is performed based on both velocity control and phase control for achieving phase locking with the Y station.

The image forming unit 1Y comprises the photoconductor 3Y. The photoconductor 3Y is arranged such that its axis is perpendicular to the traveling direction of the intermediate feeding belt 10. Around the photoconductor 3Y, a charging device 4Y which charges the photoconductor 3Y, a development device 6Y which develops an electrostatic image by supplying yellow toner to a charged portion to form a toner image on the photoconductor, and a cleaning device 5Y which removes toner remaining on the photoconductor 3Y. Note that the remaining image forming units 1M, 1C, and 1K have the same arrangement as that of the image forming unit 1Y, and a detailed description thereof will be omitted.

The monochromatic images of yellow, magenta, cyan, and black developed on the photoconductors 3Y, 3M, 3C, and 3K are superposed on the intermediate feeding belt 10 upon passing once, and a multicolor toner image is formed. After that, the multicolor toner image formed on the intermediate feeding belt 10 is transferred at once onto a printing medium 11, and a multicolor image is formed on the printing medium 11.

Figure 2:
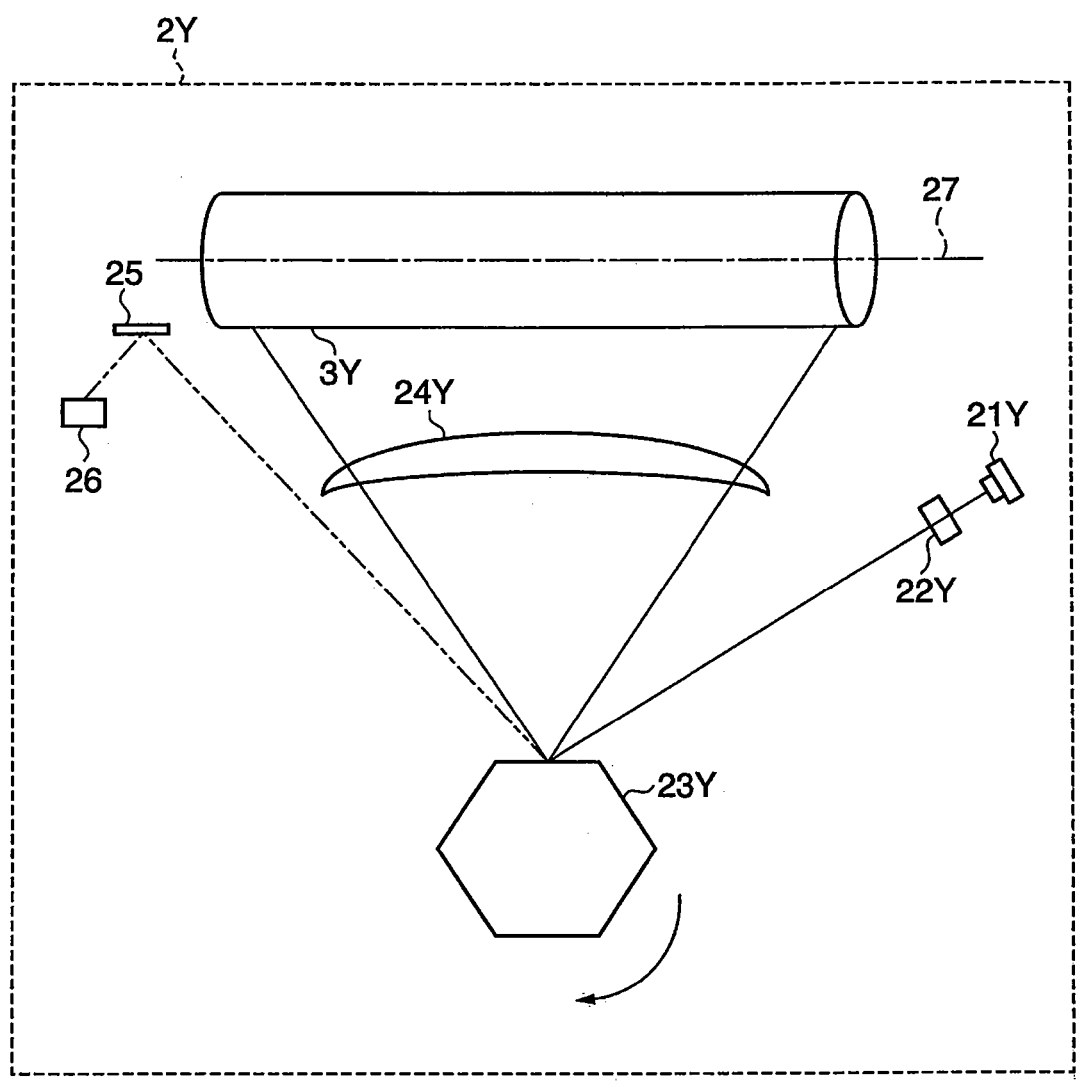
FIG. 2 is a view showing the arrangement of each light beam scanning device 2Y, 2M, 2C, or 2K arranged in each image forming unit 1Y, 1M, 1C, or 1K.

FIG. 2 is a view showing the arrangement of a light beam scanning device arranged in each of the image forming units 1Y, 1M, 1C, and 1K. Since the light beam scanning devices 2Y, 2M, 2C, and 2K have the same arrangement, only the arrangement of the light beam scanning device 2Y will be described, and the description of the light beam scanning devices 2M, 2C, and 2K will be omitted. The light beam scanning device 2Y comprises a laser light source 21Y. On the laser beam exit side of the laser light source 21Y, a collimator lens 22Y and polygon mirror 23Y are arranged. The polygon mirror 23Y can be rotatably driven in the direction of an arrow by a driving motor (not shown). The laser beam irradiated from the laser light source 21Y is collimated by the collimator lens 22Y, and strikes the reflection surface of the polygon mirror 23Y.

On the laser beam exit side of the polygon mirror 23Y, an fθ lens 24Y is arranged. The laser beam which is reflected and polarized along a predetermined direction by the reflection surface of the polygon mirror 23Y strikes the photoconductor 3Y through the fθ lens 24Y. The laser beam which strikes the photoconductor 3Y is modulated in accordance with the Y component of image to be formed on the printing medium. Along with rotation of the polygon mirror 23Y, the laser beam is scanned on the outer surface of the photoconductor 3Y in a direction parallel to an axis 27 of the photoconductor 3Y. As a result, an Y electrostatic latent image is formed on the photoconductor 3Y. Note that the driving operation in the sub scanning direction can be performed by rotating the photoconductor 3Y on the axis 27. Similar to the Y image, when the M, C, and K images are to be formed, electrostatic latent images of M, C, and K components of the image to be formed on the printing medium are sequentially formed at predetermined timings after start of image forming of the Y component.

On the laser beam exit side of the fθ lens 24Y, a mirror 25Y is arranged at a position corresponding to the end of scanning start side of an entire scan range of the laser beam. The laser beam reflected by the mirror 25Y strikes a beam detect (to be abbreviated as "IBD" hereinafter) sensor 26Y. A signal output from the BD sensor 26Y is fed back to a controller 31 (see FIG. 3) as a BD_Y signal. On the basis of the BD_Y signal, the controller 31 can determine a main scanning image write start timing of the image forming unit 1Y. The main scanning write start timing of each image forming unit (1M, 1C, or 1K) can also be determined based on a BD_M, BD_C, or BD_K signal. Based on the BD_Y signal, the controller 31 can also determine the sub scanning write start timing of each image forming unit (1M, 1C, or 1K).

Note that in FIG. 2, the mirror 25Y is arranged to directly receive light reflected by the polygon mirror 23Y. However, the mirror 25Y may be arranged at a position wherein light is received after passing through the fθ lens 24Y.

For example, an image forming apparatus which includes image forming units (1Y, 1M, 1C, 1K) of a plurality of colors, each having an image carrier (photoconductor) and a light beam scanning means (e.g., light beam scanning apparatus 2Y, 2M, 2C, or 2K) for polarizing irradiated laser beam by a polygon mirror and forming an electrostatic latent image on the image carrier, and forms a color image by superposing images formed by the image forming units, comprises a first control portion (polygon mirror control unit 32Y) for controlling velocity of rotation of one polygon mirror (23Y) in one image forming means (e.g., 1Y), a second control portion (polygon mirror control units 32M, 32C, and 32K) for controlling rotation of another polygon mirror by velocity control or phase control in another image forming means (e.g., 1M, 1C, or 1K), and a control signal generation unit (e.g., controller 31) for, when the rotation velocity of another polygon mirror reaches a target velocity by velocity control of the second control portion, generating a rotation reference signal based on driving information of the one polygon mirror driven by velocity control of the first control portion, or detection information of the laser beam polarized by the one polygon mirror, wherein the second control portion controls, when the control signal generation unit outputs the rotation reference signal, a rotational phase of another polygon mirror in order to achieve phase locking with the rotation reference signal.

Figure 3:
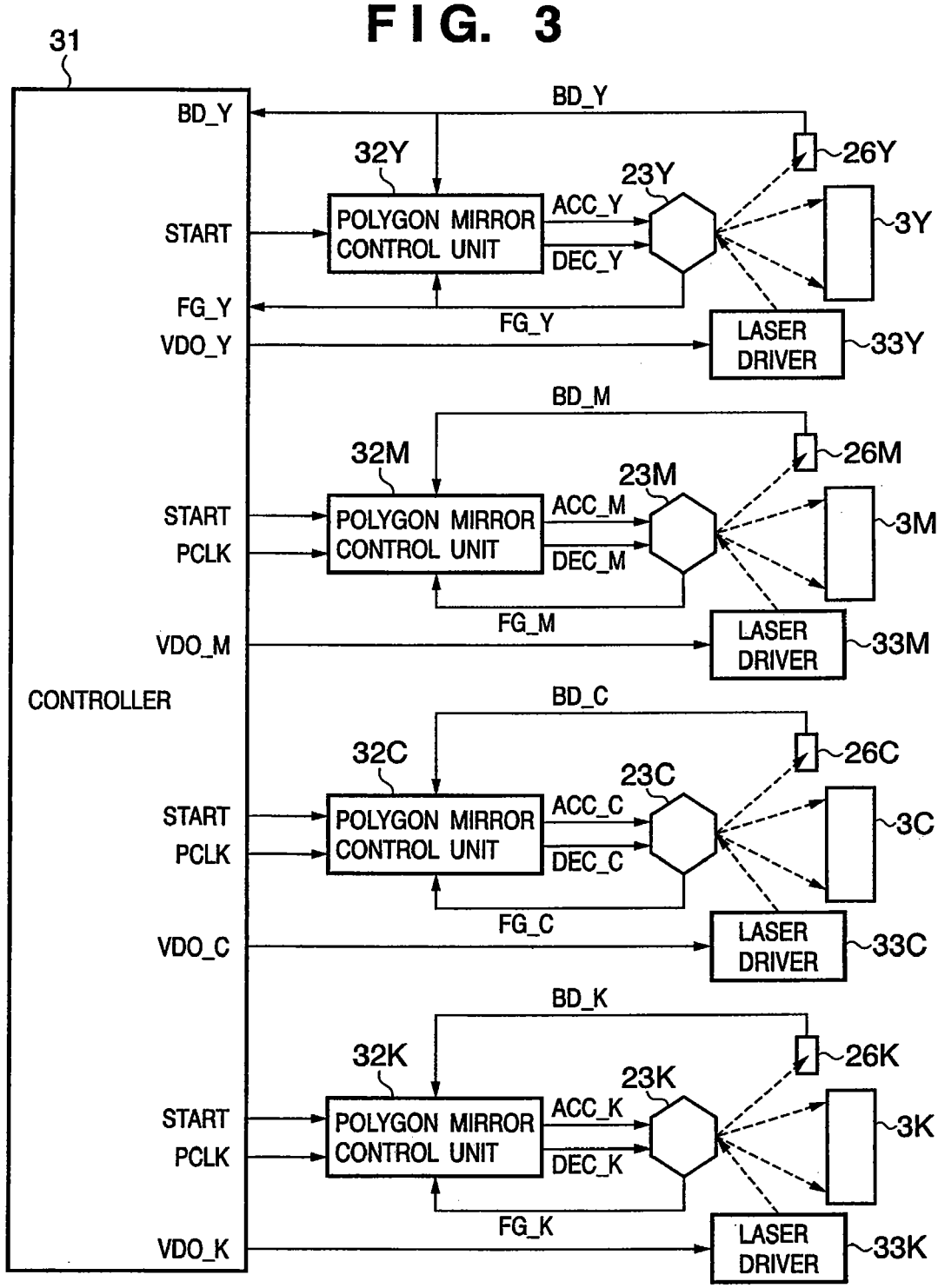
FIG. 3 is a bock diagram schematically showing the arrangement for controlling the color image forming apparatus 20.
Figure 4A:
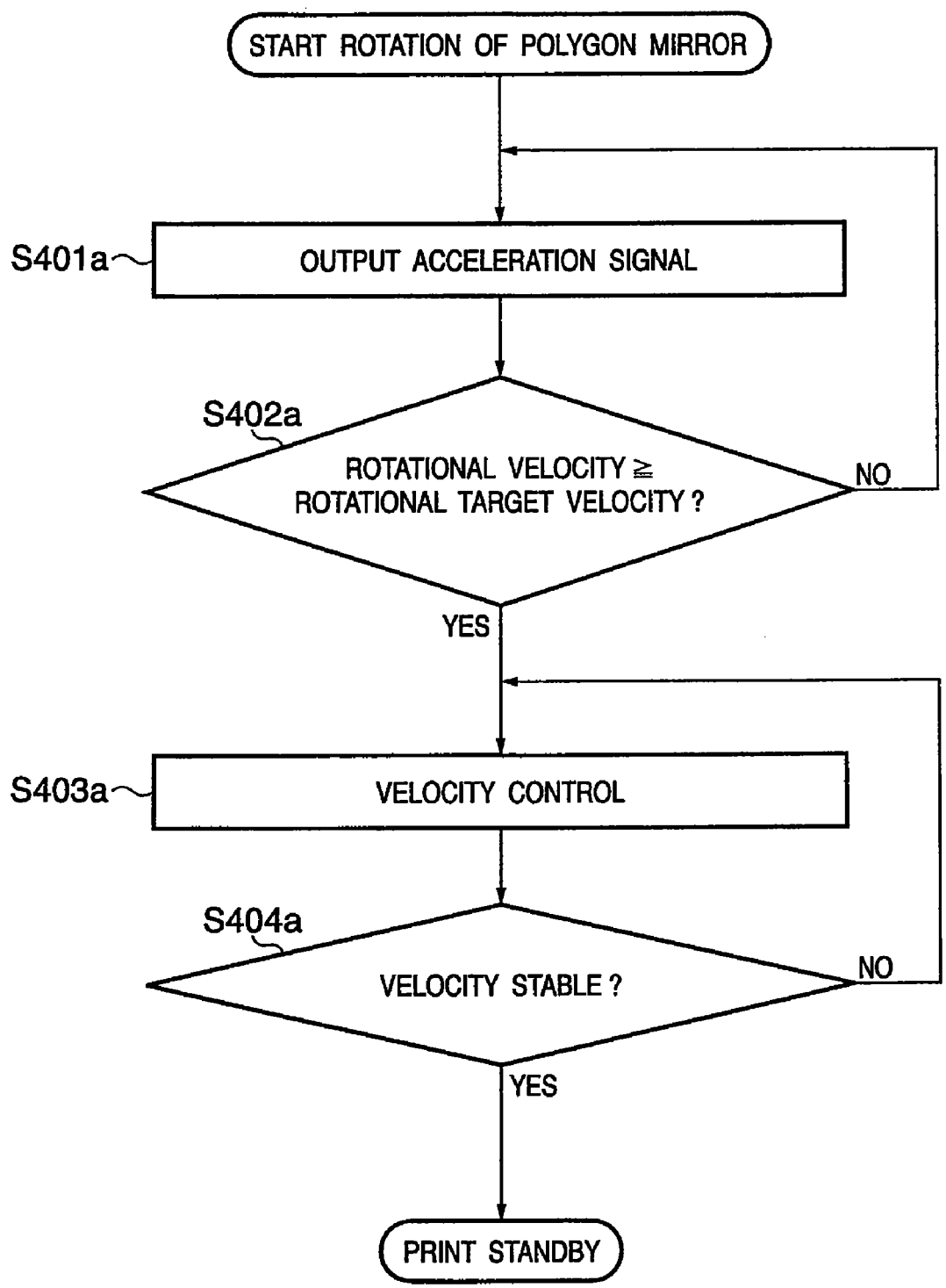
FIG. 4A is a flowchart for explaining an activation sequence of a scanner motor in the image forming unit 1Y.
Figure 4B:
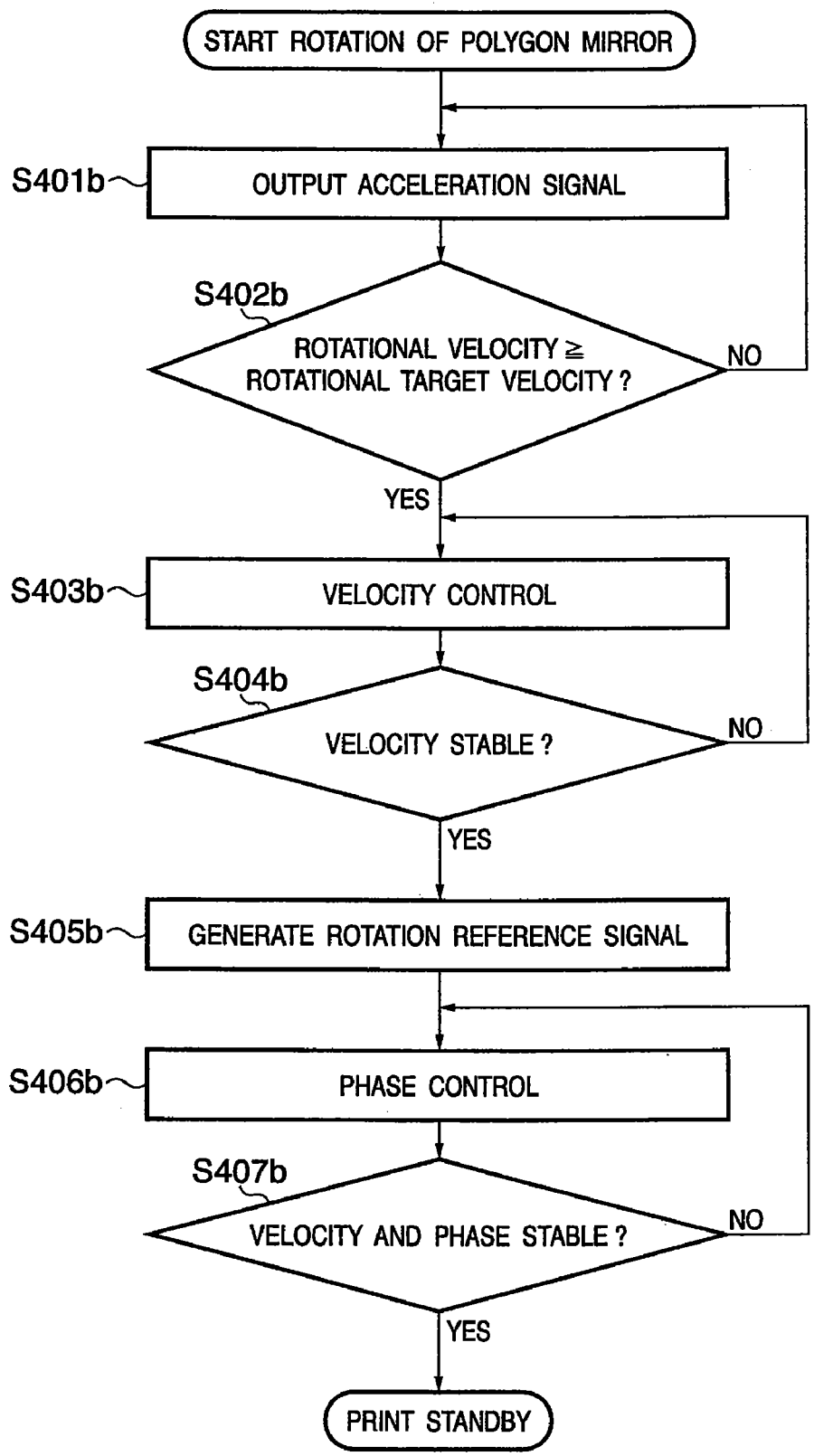
FIG. 4B is a flowchart for explaining an activation sequence of a scanner motor in each of the image forming units 1M, 1C, and 1K.

FIG. 3 is a bock diagram schematically showing the arrangement for controlling the color image forming apparatus 20. FIG. 4A is a flowchart for explaining an activation sequence of the scanner motor in the image forming unit 1Y. FIG. 4B is a flowchart for explaining an activation sequence of the scanner motor in each of the image forming units 1M, 1C, and 1K. In this embodiment, as an image forming timing, an Y image is first formed, and after that, M, C, and K images are sequentially formed. However, the object of the present invention is not limited to this. For example, the present invention can be applied to a case wherein the K, M, or C image is first formed.

The control flow of the color image forming apparatus 20 will be described below with reference to FIGS. 3, 4A, and 4B.

The controller 31 is a unit which controls the overall color image forming apparatus 20. Upon reception of scanner motor activation start signals from the controller 31, the polygon mirror control units 32Y, 32M, 32C, and 32K in the respective Y, M, C, and K stations output acceleration signals (ACC_Y, ACC_M, ACC_C, and ACC_K) (S401a, S401b). Upon reception of the acceleration signals (ACC_Y, ACC_M, ACC_C, and ACC_K), the scanner motors start rotation.

Simultaneously, each of the polygon mirror control units 32Y, 32M, 32C, and 32K counts, by using its counter, a floor ground (FG) signal (FG_Y, FG_M, FG_C, or FG_K) output in accordance with the magnetic pole pattern arranged in each scanner motor, or a BD signal (BD_Y, BD_M, BD_C, or BD_K) output from the BD sensor 26Y, 26M, 26C, or 26K. In this count process, the period and count value of a signal in a predetermined period of time can be obtained.

Assume that the FG signal (FG_Y, FG_M, FG_C, or FG_K) is used as a reference of a velocity reference signal or PLL reference signal (PCLK) for rotatably driving the polygon mirror 23Y, 23M, 23C, or 23K. In this case, the polygon mirror control unit 32Y, 32M, 32C, or 32K can count the FG signal (FG_Y, FG_M, FG_C, or FG_K) when an image need not be formed, e.g., at a timing before a printing medium is started to be conveyed, a timing between the convey processes of one printing medium and a next printing medium, or an acceleration (rising) timing for driving the polygon mirror 23Y, 23M, 23C, or 23K.

While the polygon mirror control unit 32Y, 32M, 32C, or 32K controls driving of the polygon mirror 23Y, 23M, 23C, or 23K on the basis of the FG signal (FG_Y, FG_M, FG_C, or FG_K), a semiconductor laser need not be activated by driving the laser light source 21Y, 21M, 21C, or 21K for detecting the BD signal (BD_Y, BD_M, BD_C, or BD_K). Therefore, the semiconductor laser can be advantageously used for a long period of time by reducing the load on the laser light source 21Y, 21M, 21C, or 21K, thereby prolonging the life time of the semiconductor laser. On the other hand, when the detection precision of the FG signal (FG_Y, FG_M, FG_C, or FG_K) is not sufficient as compared with that of the BD signal (BD_Y, BD_M, BD_C, or BD_K), the BD (BD_Y, BD_M, BD_C, or BD_K) is desirably used in consideration of the life time of the semiconductor laser.

The polygon mirror control unit 32Y, 32M, 32C, or 32K continuously outputs the acceleration signal (ACC_Y, ACC_M, ACC_C, or ACC_K) until the count value obtained by the counter in the polygon mirror control unit 32Y, 32M, 32C, or 32K reaches the count value corresponding to the stored rotational target velocity (the rotational velocity is calculated based on a signal count value in a predetermined period of time) (S402a, S402b).

When the polygon mirror control unit 32Y, 32M, 32C, or 32K detects that the count value becomes equal to or larger than the count value corresponding to the rotational target velocity (YES in S402a, YES in S402b), the flow advances to steps S403a and S403b. The polygon mirror control unit 32Y, 32M, 32C, or 32K outputs a deceleration signal (DEC_Y, DEC_M, DEC_C, or DEC_K) if the rotational velocity of the polygon mirror 23Y, 23M, 23C, or 23K is equal to or higher than the rotational target velocity. On the other hand, the polygon mirror control unit 32Y, 32M, 32C, or 32K outputs the acceleration signal (ACC_Y, ACC_M, ACC_C, or ACC_K) if the rotational velocity of the polygon mirror 23Y, 23M, 23C, or 23K is equal to or lower than the rotational target velocity. Accordingly, the polygon mirror control unit 32Y, 32M, 32C, or 32K starts velocity control (S403a, S403b) for the polygon mirror 23Y, 23M, 23C, or 23K to control the rotation count of the scanner motor which drives each polygon mirror 23Y, 23M, 23C, or 23K.

In step S404a shown in FIG. 4A, the polygon mirror control unit 32Y determines whether the rotational velocity based on the counter value of the scanner motor in the Y station falls within a range around the rotational target velocity. If the output value obtained by the counter falls within the predetermined range (YES in S404a), the polygon mirror control unit 32Y determines that the rotational velocity of the polygon mirror 23Y has stabilized. After that, the polygon mirror control unit 32Y sets the Y station 1Y in a print standby state.

The stability of velocity can be determined by setting an allowable range (e.g., the range of ±a % around a rotational target velocity VA) to the velocity (rotational target velocity) as a target value, and determining, by the polygon mirror control unit 32Y, whether the rotational velocity of the polygon mirror 23Y falls within this allowable range.

Note that when a printing start signal is output from the controller 31, or when a printing start signal is output in the standby state, the Y station 1Y starts forming an image in accordance with an image signal (VDO_Y) output from the controller 31.

When the rotational velocity of the polygon mirror 23M, 23C, or 23K stabilizes (YES in S404b) by velocity control in the polygon mirror control unit 32M, 32C, or 32K of the M, C, or K station (1M, 1C, or 1K) in step S403b shown in FIG. 4B, the flow advances to step S405b.

The stability of velocity can be determined by setting the allowable range (e.g., the range of ±a % around the rotational target velocity VA) to the velocity (rotational target velocity) as the target value, and determining, by the polygon mirror control unit (32M, 32C, or 32K), whether the rotational velocity of the polygon mirror (23M, 23C, or 23K) falls within this allowable range.

In step S405b, the controller 31 generates a rotation reference signal (PCLK) based on the BD signal (BD_M, BD_C, or BD_K) output from the BD sensor 26M, 26C, or 26K in the station 1M, 1C, or 1K, or the FG signal (FG_M FG_C, or FG_K) output upon detection of the rotational phase of the scanner motor.

In step S406b, the polygon mirror control unit (32M, 32C, or 32K) outputs the acceleration signal (ACC_M, ACC_C, or ACC_K) or deceleration signal (DEC_M, DEC_C, or DEC_K) in order to achieve phase locking with the phase of the rotation reference signal (PCLK). The polygon mirror control unit then performs PLL control (Phase Locked Loop: phase control) in order to achieve phase locking with the laser irradiation timing in the Y station 1Y.

Figure 4C:
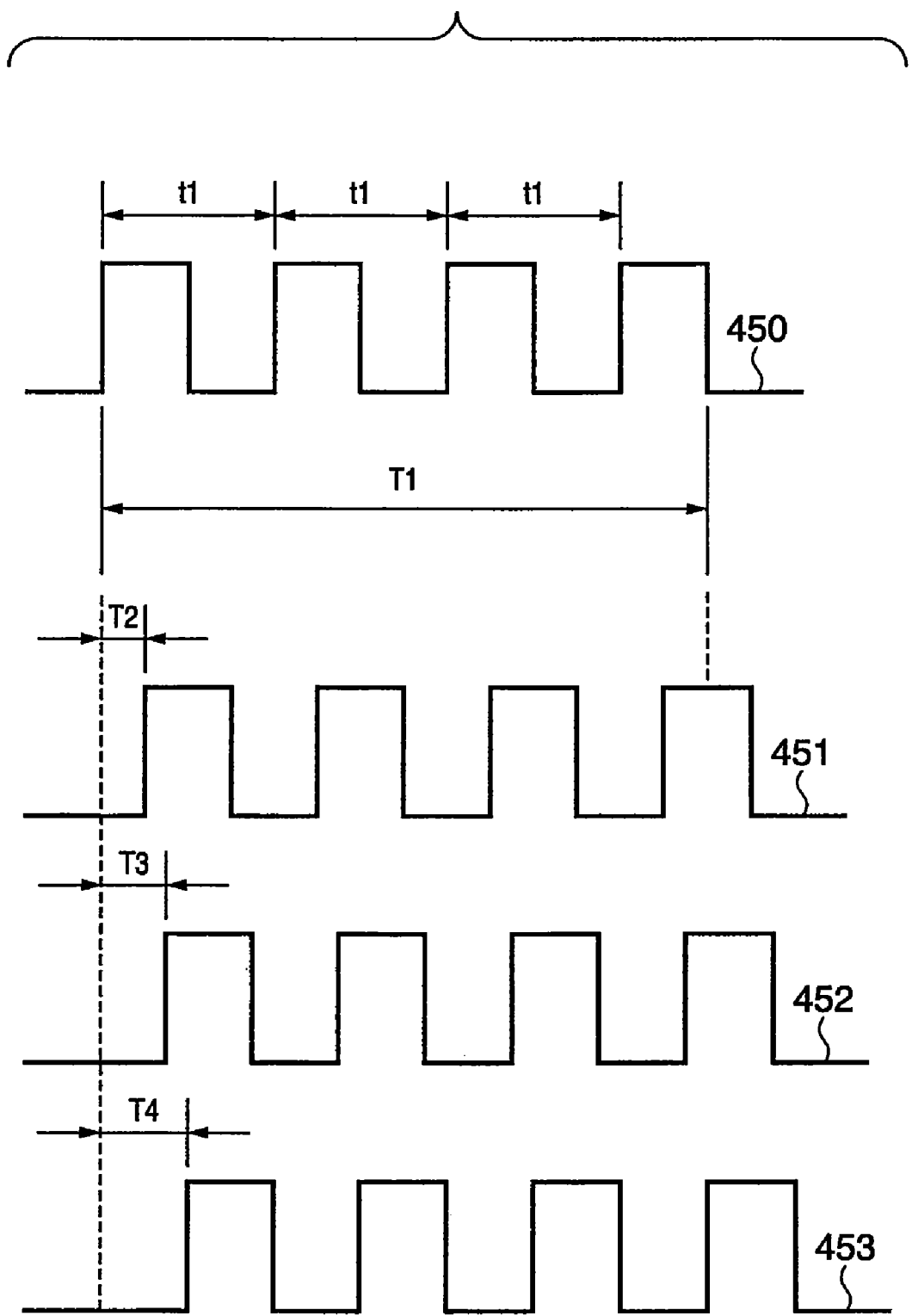
FIG. 4C is a timing chart exemplifying a waveform 450 of a rotation reference signal (PCLK), and waveforms 451 to 453 representing the rotation driving results of polygon mirrors 23M, 23C, and 23K, which are counted by counters in respective polygon mirror control units (32M, 32C, and 32K)
Figure 5:
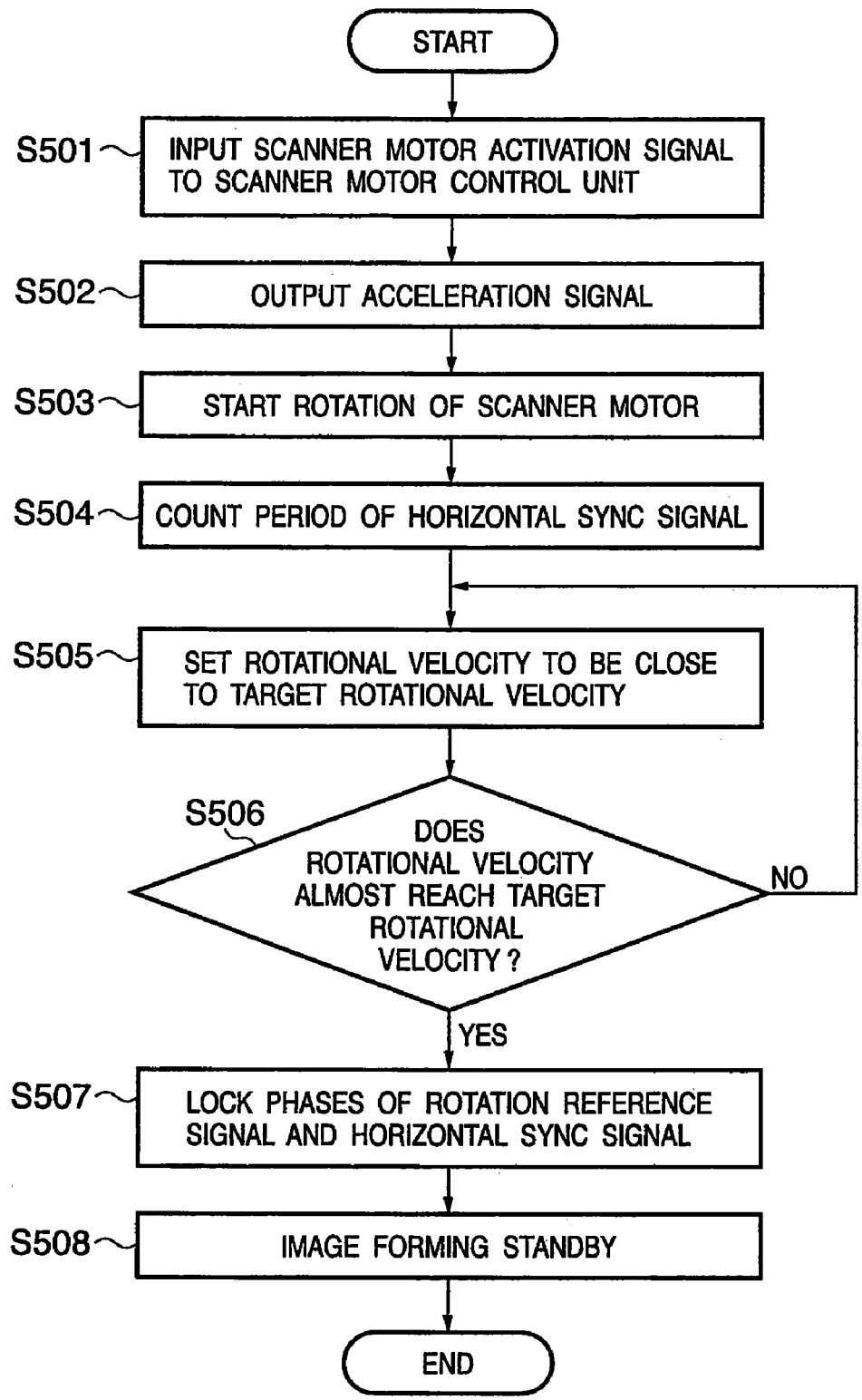
FIG. 5 is a flowchart for explaining a control sequence of a conventional scanner motor.

FIG. 4C is a timing chart exemplifying a waveform 450 of the rotation reference signal (PCLK), and waveforms 451 to 453 representing the results of the rotation driving of polygon mirrors 23M, 23C, and 23K, which are counted by counters in the respective polygon mirror control units (32M, 32C, and 32K).

The waveform 450 represents a state wherein four pulses are output in a period T1. The waveform 451 for representing the driving result of the polygon mirror 23M represents a state wherein the waveform 451 is shifted by a phase T2 from the waveform 450. The waveform 452 for representing the driving result of the polygon mirror 23C represents a state wherein the waveform 452 is shifted by a phase T3 from the waveform 450. The waveform 453 for representing the driving result of the polygon mirror 23K represents a state wherein the waveform 453 is shifted by a phase T4 from the waveform 450.

The polygon mirror control unit (32M, 32C, or 32K) compares the waveform of the rotation reference signal (PCLK) with the signal wavelength (451, 452, or 453) for representing the rotation driving result of the polygon mirror (23M, 23C, or 23K) to obtain a phase difference. The polygon mirror control unit then performs acceleration or deceleration control (rotates) for the scanner motor which rotates the polygon mirror to implement a predetermined phase difference T2, T3, or T4 in FIG. 4C. In this case, the polygon mirror control unit (32M, 32C, or 32K) generates a phase difference component as a control instruction for driving the scanner motor. On the basis of this instruction, acceleration or deceleration control can be performed.

FIG. 6 is a timing chart for explaining control of the phase difference between, e.g., the Y and M phase signals. Reference numeral 610 denotes a state wherein the write start timing of an M line 602 delays by a ½ line from that of an Y line 601. On the other hand, reference numeral 620 denotes a state wherein the M line 602 advances the write start timing by a ½ line. The timing delay of the M line is eliminated, and the Y and M lines coincide with each other as denoted by reference numeral 605.

When the image forming timings are synchronized with each other by combining velocity control and phase control, color discrepancy in the main scanning direction and the sub scanning direction can be prevented.

Furthermore, even when color discrepancy of one line in the sub scanning direction occurs, the polygon mirror control unit (32M, 32C, or 32K) sets an offset amount of the predetermined number of counts to the rotation reference signal (PCLK) based on the driving result of the Y station 1Y, thereby suppressing color discrepancy to that equal to or less than one line.

In step S407b, the polygon mirror control unit 32M, 32C, or 32K compares the rotation reference signal (PCLK) with the FG signal (FG_M, FG_C, or FG_K) or BD signal (BD_M, BD_C, or BD_K) of the M, C, or K station (1M, 1C, or 1K) which has undergone phase control. When the count value obtained by the counter in the polygon mirror control unit 32M, 32C, or 32K falls within a predetermined range (PV±p) around the pulse output (target value PV) of the rotation reference signal (PCLK) (YES in S407b), the polygon mirror control unit 32M, 32C, or 32K determines that the image forming unit is in a stable state wherein the rotational velocity of the polygon mirror 23M, 23C, or 23K and a predetermined phase difference between the Y station 1Y and the polygon mirror 23M, 23C, or 23K are ensured (YES in S407b). The polygon mirror control units 32M, 32C, and 32K respectively set the M station 1M, C station 1C, and K station 1K in the printing standby state.

When the printing start signal is output from the controller 31, or when the printing start signal is output from the controller 31 after shifting to the printing standby state, the M station 1M, C station 1C, or K station 1K starts forming an image in accordance with the image signal (VDO_M, VDO_C, or VDO_K) output from the controller 31.

According to this embodiment, the present invention can provide an image forming technique with high productivity which can shorten the time from when the polygon mirrors (23Y, 23M, 23C, and 23K) in the respective image forming units (1Y, 1M, 1C, and 1K) sequentially start rotation to when the rotational velocities become stable in the image forming standby state, while suppressing a registration error when a color image is to be formed.

OTHER EMBODIMENT

The object of the present invention is achieved even by supplying a storage medium which stores software program codes for implementing the functions of the above-described embodiment to the system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As a storage medium for supplying the program codes, a flexible disk, a hard disk, an optical disk, a magnetooptical disk, a CD-ROM, a CD-R, a magnetic tape, a nonvolatile memory card, a ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-122950, filed Apr. 20, 2005, which is hereby incorporated by reference herein in its entirety.

What is claimed is:

1. An image forming apparatus which comprises:
   image forming units of a plurality of colors, each of which has an image carrier and a light beam scanning unit for deflecting an emitted laser beam using a rotating polygonal mirror to form an electrostatic latent image on the image carrier, and forms a color image by overlapping images formed by the image forming units;
   a first control device which performs velocity control of rotation of the rotating polygonal mirror in a first image forming unit of the image forming units, for starting forming an image first;
   a second control device which controls rotation of the rotating polygonal mirror in a second image forming unit by performing velocity control and phase control; and
   a control signal generation device which, when a rotational velocity of the rotating polygonal mirror in the first image forming unit reaches a predetermined velocity, generates a rotation reference signal based on driving information of the rotating polygonal mirror in the first image forming unit or detection information of the laser beam deflected by the rotating polygonal mirror,
   wherein the second control device starts, based on the rotation reference signal generated by the control signal generation device, phase control to lock a rotational phase of the rotating polygonal mirror in the second image forming unit with a rotational phase of the rotating polygonal mirror in the first image forming unit.

2. The apparatus according to claim 1, wherein, when the rotational velocity of the second rotating polygonal mirror reaches a target velocity by performing velocity control, the second control device starts phase control of rotation of the rotating polygonal mirror in the second image forming unit to lock the phase with a phase of the rotation reference signal.

3. The apparatus according to claim 1, wherein, when the rotational velocity of the first rotating polygonal mirror reaches a target velocity by performing velocity control of the first control device, the first image forming unit starts forming an image in accordance with the received image signal.

4. The apparatus according to claim 1, wherein, when the rotational velocity of the second rotating polygonal mirror reaches a target velocity by performing control of the second control device, and when the rotational phase of the first rotating polygonal mirror falls within a target range, the second image forming unit starts forming an image in accordance with the received image signal.

5. An image forming method for an image forming apparatus which includes image forming units of a plurality of colors, each of which has an image carrier and a light beam scanning unit for deflecting an emitted laser beam using a rotating polygonal mirror to form an electrostatic latent image on the image carrier, and forms a color image by overlapping images formed by the image forming units, comprising:
   a first control step of performing velocity control of rotation of a first rotating polygonal mirror used to start forming an image first;
   a second control step of controlling rotation of a second rotating polygonal mirror by performing velocity control and phase control; and
   a control signal generation step of, when a rotational velocity of the first rotating polygonal mirror reaches a predetermined velocity, generating a rotation reference signal based on driving information of the first rotating polygonal mirror or detection information of the laser beam deflected by that rotating polygonal mirror,
   wherein, in the second control step, based on the rotation reference signal output in the control signal generation step, phase control is started to lock a rotational phase of the second rotating polygonal mirror with a rotational phase of the rotating first polygonal mirror.

* * * * *